US008370343B2

(12) United States Patent
Biggs et al.

(10) Patent No.: US 8,370,343 B2
(45) Date of Patent: Feb. 5, 2013

(54) SELECTING DIRECTLY BID UPON ADVERTISEMENTS FOR DISPLAY

(75) Inventors: Jody D. Biggs, Redmond, WA (US); Li Li, Issaquah, WA (US); Robert J. Ragno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 590 days.

(21) Appl. No.: 11/395,850

(22) Filed: Mar. 31, 2006

(65) Prior Publication Data

US 2007/0233653 A1    Oct. 4, 2007

(51) Int. Cl.
G06F 7/00      (2006.01)
G06Q 30/00    (2012.01)
(52) U.S. Cl. .................................. 707/728; 705/14.41
(58) Field of Classification Search .................. 707/728; 705/14
See application file for complete search history.

(56) References Cited

U.S. PATENT DOCUMENTS

| | | | |
|---|---|---|---|
| 7,523,087 B1 * | 4/2009 | Agarwal et al. | 705/7.29 |
| 2004/0236736 A1 * | 11/2004 | Whitman et al. | 707/3 |
| 2006/0242017 A1 * | 10/2006 | Libes et al. | 705/14 |
| 2006/0287919 A1 * | 12/2006 | Rubens et al. | 705/14 |
| 2008/0010270 A1 * | 1/2008 | Gross | 707/5 |

OTHER PUBLICATIONS

"A new edition to the Quality Score," http://adwords.blogspot.com/2005/12/new-addition-to-quality-score.html, 1 page, Dec. 8, 2005.*
"A new edition to the Quality Score", published Dec. 8, 2005 http://adwords.blogspot.com/2005/12/new-addition-to-quality-score.html.*

* cited by examiner

Primary Examiner — Apu Mofiz
Assistant Examiner — Chelcie Daye
(74) Attorney, Agent, or Firm — Shook, Hardy & Bacon L.L.P.

(57) ABSTRACT

Methods and systems in search marketing which permit advertisers to provide advertisements to a search engine, as well as bids associated with the advertisements themselves, are provided. Advertisements are selected for presentation when they are determined to be relevant and payment for presentation is due only upon the conditions of the bid being met. If desired, advertisers may be permitted to provide, in addition to an advertisement, one or more destination pages associated with selection of the advertisement. In this case, relevance can be determined not only on the basis of the content of the advertisement itself, but also on the content of the destination page(s).

11 Claims, 5 Drawing Sheets

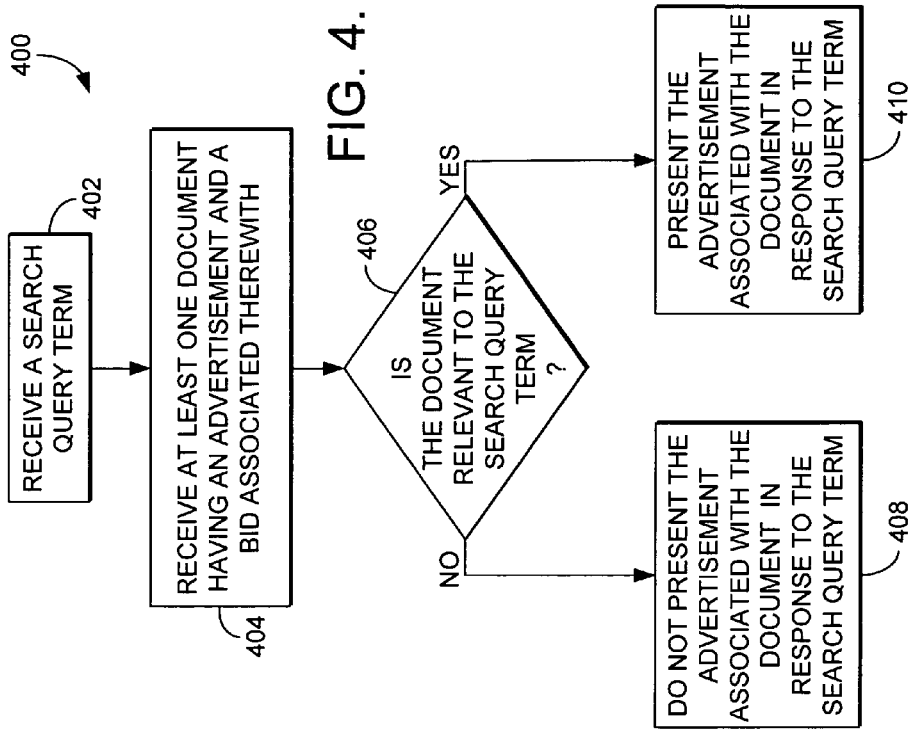
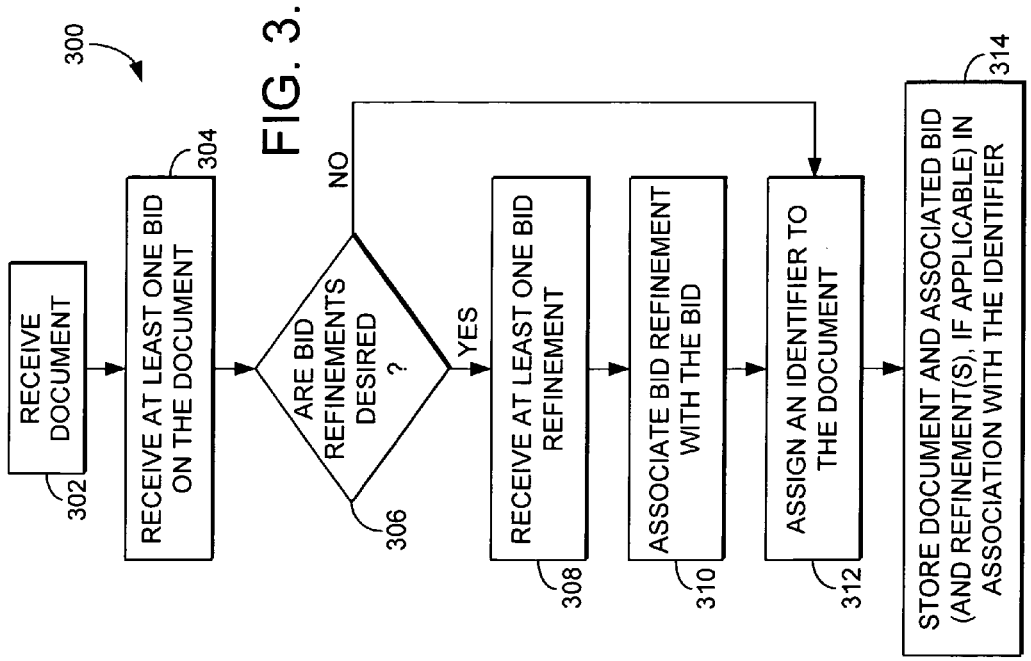

SELECTING DIRECTLY BID UPON ADVERTISEMENTS FOR DISPLAY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

In the paid search industry, advertisements which are considered candidates for display in response to search query terms are typically determined based upon advertisers placing bids on keywords. Advertisers can select among several search query term match types including exact match, phrase match, and broad match. Exact match determines that an advertisement should be selected for display if a search query term is identical to the keyword bid upon by the advertiser. Phrase match determines that an advertisement should be selected for display as long as the bid upon keyword is contained as a phrase somewhere within the search query term. Broad match determines that an advertisement should be selected for display as long as all of the individual terms included in the bid upon keyword are contained somewhere within the search query term.

Keyword-based matching techniques have a number of drawbacks. In particular, management is often too complicated and/or costly for many small to medium-sized advertisers. For instance, to successfully employ a keyword-based matching technique, an advertiser must perform research into user search queries to determine which query terms are commonly searched upon and, based on this information, decide which keywords to bid upon. Subsequently, they must decide how much to bid on each keyword and if they desire to place different bids, or different types of bids, on different keywords. As the keyword bid landscape changes frequently, the advertiser must also constantly monitor their position on the keywords they have bid upon to ensure their advertisements are being displayed to enough users to justify their expense on an on-going basis.

Additionally, the search query term tail presents an issue in keyword-based matching techniques. There are many search terms with very little traffic which, in aggregate, are valuable but are difficult to manage due to their great numbers and low traffic volumes. This is the search query term tail. With keyword-based matching, an advertiser placing phrase and broad match bids on keywords may cover a portion of the search query term tail. When this occurs, it tends to result in the advertisements being displayed, in part, on search query terms for which they are not relevant. Such low relevance matches create user dissatisfaction with the search engine displaying the advertisements as well as challenges for an advertising system attempting to optimize revenue for that search engine.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In embodiments, advertisers are permitted to provide advertisements to a search engine, as well as bids (e.g., cost-per-click or cost-per-acquisition bids) associated with the advertisements themselves. That is, rather than placing a bid to have their advertisement presented upon user entry of a particular keyword, advertisers are permitted to place a bid for an amount they are willing to pay each time their advertisement is presented and the conditions of the bid are met—without specifying any parameter as to when the advertisement is to be presented. For instance, if an advertiser places a cost-per-click bid on an advertisement, the bid amount represents an amount the advertiser is willing to pay each time their advertisement is presented and selected by a user. Alternatively, if an advertiser places a cost-per-acquisition bid on an advertisement, the bid amount represents an amount the advertiser is willing to pay each time their advertisement is presented and a sale of the advertised product or service is completed as a result of such presentation. Such methods and systems are advantageous to advertisers as they only have to pay the search engine for presenting their advertisement if the conditions of the bid are met. Further, the search engine is incentivized to display an advertisement only when it is determined to be relevant as it will only receive payment if the conditions of the bid placed on the advertisement are met.

In other embodiments, advertisers are permitted to provide, in addition to an advertisement, one or more destination pages associated with selection of the advertisement. In this embodiment, relevance can be determined not only on the basis of the content of the advertisement itself, but also on the content of the destination page(s).

BRIEF DESCRIPTION OF THE SEVERAL VIEWS OF THE DRAWINGS

The present invention is described in detail below with reference to the attached drawing figures, wherein:

FIG. 3 is a flow diagram, in accordance with an embodiment of the present invention, illustrating a method for accepting bids for presentation of advertisements in response to a search query term;

FIG. 4 is a flow diagram illustrating a method for selecting advertisements for presentation in response to a search query term, in accordance with an embodiment of the present invention.

DETAILED DESCRIPTION

Figure 1:
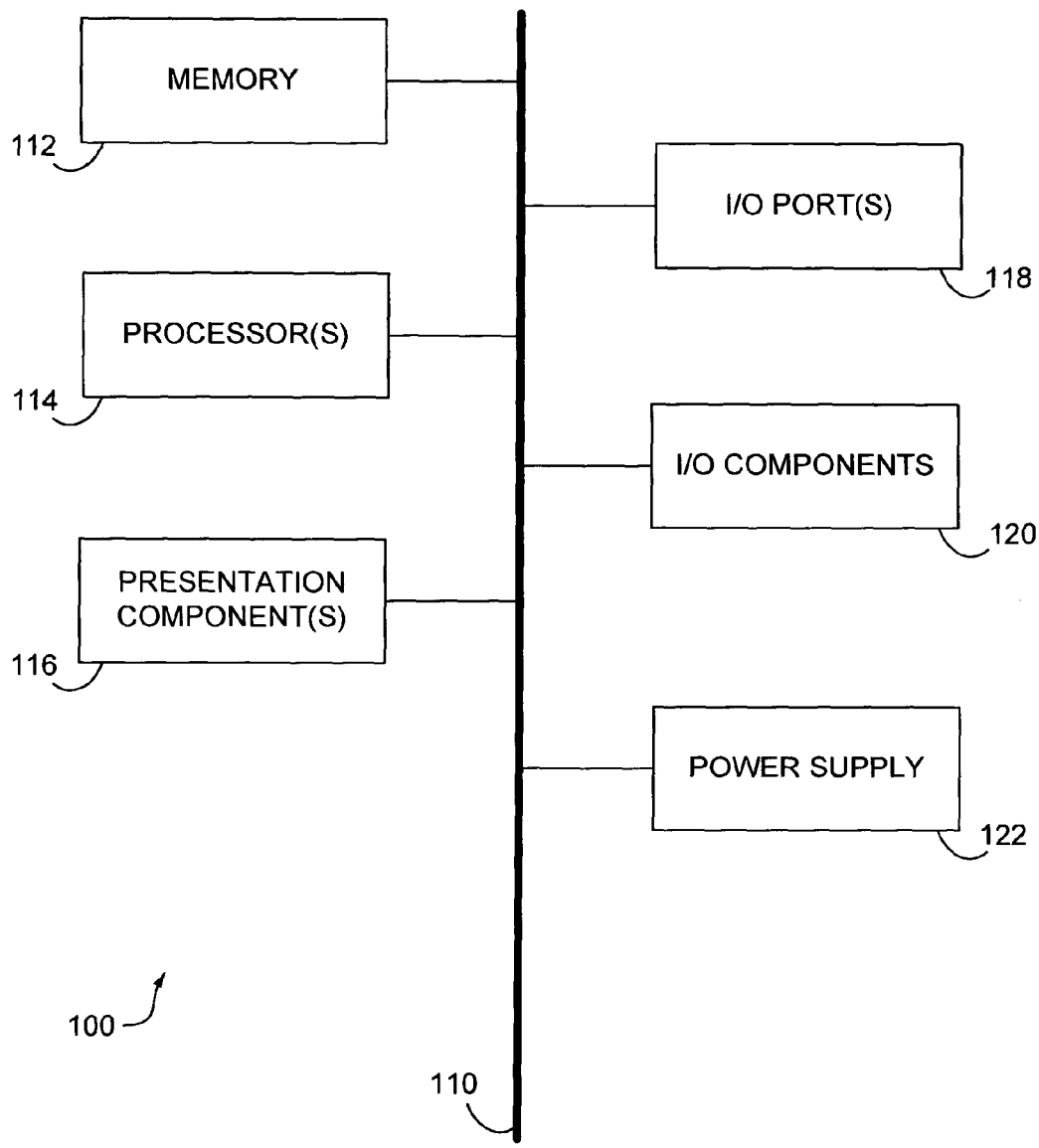
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems and methods in search marketing for permitting advertisers to place bids (e.g., cost-per-click or cost-per-acquisition bids) on advertisements themselves rather than on specified keywords. That is, an advertiser interested in having an advertisement presented may provide the advertisement and, for example, a cost-per-click bid (i.e., a bid the advertiser is willing to pay each time the advertisement is presented and selected by a user) or a cost-per-acquisition bid (i.e., a bid the advertiser is willing to pay each time the advertisement is presented and a sale of the advertised product or service is completed as a result of such presentation) in association with the advertisement. To optimize their monetization, search engines then select advertisements for presentation only when they are determined to be relevant.

Additional embodiments of the present invention provide systems and methods that permit advertisers to provide, in addition to advertisements, one or more destination page(s) associated with selection of the advertisement. Systems and methods in accordance with this embodiment, permit the advertiser to place bids on the combination of the advertisement and the destination page(s). Relevance may then be determined not only on the basis of the content of the advertisement itself, but also on the content of the destination page(s).

Accordingly, one embodiment of the present invention is directed to a method for selecting advertisements for presentation in response to a search query term. The method includes receiving the search query term, receiving at least one document having an advertisement and a bid associated therewith, determining if the document is relevant to the search query term, and if the document is determined to be relevant to the search query term, presenting the advertisement associated with the document in response to the search query term. If desired, the method may further include determining if the received search query term includes more than one individual term and, if so, for each individual term, identifying a subset of the plurality of documents containing the individual term, determining a threshold number of individual terms, and identifying a set of pre-qualified documents by comparing the subset of documents for each individual term with one another to identify documents containing the threshold number of individual terms. The method may further include identifying a set of matching documents, wherein each of the matching documents is a member of the set of pre-qualified documents and includes at least one grouping of two or more of the individual terms in the search query term. Still further, the method may include determining if each document of the set of matching documents is relevant to the search query term, ranking each document of the set of matching documents that is determined to be relevant, and selecting at least one advertisement for presentation based upon the ranking received by the associated document.

In another embodiment of the present invention, a method for accepting bids for presentation of advertisements in response to a search query term is provided. The method includes receiving a document including at least one advertisement associated therewith, receiving at least one bid on the document, and storing the document and the bid in association with one another. If desired, the method may further include assigning a document identifier to the document and storing the document and the bid in association with the assigned identifier.

Embodiments of the present invention are further directed to computer-readable media having computer-executable instructions for performing the methods disclosed herein.

A further embodiment of the present invention is directed to a system for selecting relevant advertisements for presentation in response to a search query term. The system includes a keyword server, a document index server, a listing server, and an advertisement server. The keyword server is configured to receive at least one search query term. The document index server is configured to identify documents stored in association therewith that contain at least a portion of the search query term, each of the documents stored in association with the document index server having at least one advertisement and a bid associated therewith. The listing server is configured to determine an expected monetization for each document stored in association with the document index server based, at least in part, upon the bid associated therewith and to rank the documents stored in association with the document index server based upon relevance to the search query term. The advertisement server is configured to retrieve relevant advertisements for presentation based upon the rankings.

Having briefly described an overview of the present invention, an exemplary operating environment for embodiments of the present invention is described below.

Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
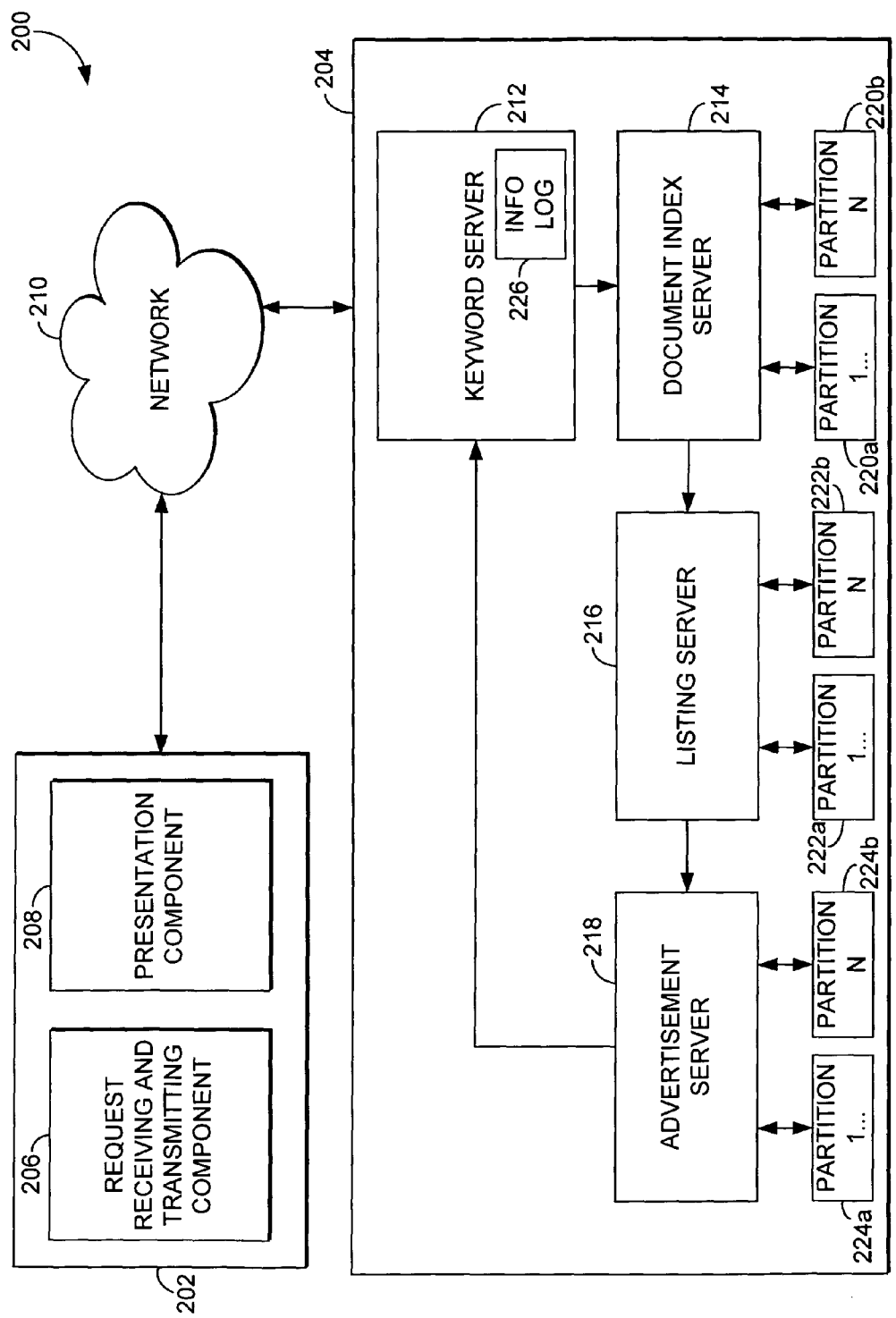
FIG. 2 is a block diagram of an exemplary system architecture for use in implementing embodiments of the present invention.

Referring now to FIG. 2, a block diagram is illustrated that shows an overall system architecture 200 for accepting advertisements for presentation in response to a search query term and bids associated with such advertisements and for selecting advertisements for display based on the search query term. It will be understood and appreciated by those of ordinary skill in the art that the overall system architecture 200 shown in FIG. 2 is merely an example of one suitable computing environment and is not intended to suggest any limitation as to the scope of use or functionality of the present invention. Neither should the overall system architecture 200 be interpreted as having any dependency or requirement related to any single component or combination of components illustrated therein.

System 200 includes a user device 202 connected to an advertisement selection system 204 via a network 210. The user device 202 shown in FIG. 2 may be any type of computing device, such as, for example, computing device 100 described above with reference to FIG. 1. By way of example only and not limitation, the user device 202 may be a user's personal computer, desktop computer, laptop computer, handheld device, consumer electronic device, and the like. It should be noted, however, that the invention is not limited to implementation on such computing devices, but may be implemented on any of a variety of different types of computing devices within the scope of embodiments of the present invention.

As shown in FIG. 2, a request receiving and transmitting component 206 and a presentation component 208 reside on the user device 202 for implementing embodiments of the present invention. In some embodiments, the components 206, 208 may be implemented as stand-alone applications. In other embodiments, the components 206, 208 may be integrated directly into the operating system for the user device 202. The request receiving and transmitting component 206 may be provided for receiving a search query term input by a user at the user device 202 and transmitting such search query term to the advertisement selection system 204 (via network 210). In the illustrated embodiment, the advertisement selection system 204 includes a keyword server 212, a document index server 214, a listing server 216 and an advertisement server 218. It will be understood by those skilled in the art that the components 212, 214, 216 and 218 illustrated in FIG. 2 are exemplary in nature and in number and should not be construed as limiting. Any number of components may be employed to achieve the desired functionality within the scope of embodiments of the present invention.

The keyword server 212 is configured to receive the search query term from the request receiving and transmitting component 206 of user device 202 (via network 210) and to forward the search query term to the document index server 214. The keyword server is additionally configured to return selected advertisement(s) to the presentation component 208 of the user device 202 (via network 210) and to store information regarding the search query term and selected advertisement(s) in an information log 226 associated therewith, as more fully described below.

The document index server 214 is configured to receive and store documents provided, for instance, by an advertiser for presentation. As used herein, the term "document" may include only the content of an advertisement (or a portion thereof) or the content of an advertisement (or a portion thereof) in conjunction with at least a portion of the content of one or more destination pages that may be accessed upon user selection of the advertisement. Each of the documents associated with the document index server 214 includes at least one advertisement and a bid associated therewith. The bid may be any type of bid known to those of ordinary skill in the art and carry any desired conditions associated therewith. For instance, and without limitation, the bid may be a cost-per-click bid or a cost-per-acquisition bid. As the volume of documents received by the document index server 214 may be quite large, one or more document index server partitions 220a, 220b may be associated therewith. The content of the documents is stored in association with a unique document identifier, for instance, assigned by the document index server 214 upon receipt.

The document index server 214 is further configured to identify, by document identifier, documents stored in association therewith that are relevant to the search query term received. In this regard, the document index server 214 is configured to identify and eliminate noise words (i.e., words that may be present in a search query term that are too common to be useful in determining relevance) from the search query term and, for search query terms containing multiple individual terms, determine whether or not a pre-determined threshold number of individual terms is present in each document associated therewith. Still further, the document index server 214 is configured to determine if at least one grouping of search query terms is present in those documents it determines contain the pre-determined threshold number of individual terms. Further still, the document index server 214 is configured to compute a relevance score for documents that include at least a portion of the search query term, apply field-weighting to the relevance scores, as applicable, and forward a listing of relevant documents (by document identifier) and their scores to the listing server 216. Each of these functions which may be performed by the document index server 214 is more fully described below with reference to FIGS. 3, 4, 5A, and 5B.

In order to achieve some of the above-identified functions, the document index server 214 is additionally configured to conduct data mining with respect to the documents received. Various techniques for data mining are known to those of ordinary skill in the art and, accordingly, are not further discussed herein. For documents containing only the content of an advertisement, data mining is performed only on the advertisement. However, for documents containing an advertisement in conjunction with one or more destination page(s), such data mining is performed with respect to both the advertisement and the destination page(s). As a result of data mining, the document index server 214 creates a document index (per language or per distribution channel). The document index is a word-based index that includes a variety of information. By way of example and not limitation, the document index may include a count of all documents in the index, an average length of documents in the index, a count of documents in the index which contain each word in the index, a list of document identifiers of documents which contain each word in the index, and a list of noise words (typically determined by a maximum threshold number of documents in the index containing the word). Additionally, in association with the document identifier, for each document, the document index may include a count of occurrences of each word in the index, the length of the document (e.g., in words using a two-byte integer), and a list of occurrence positions of each word in the document (e.g., each occurrence position being identified by a two-byte integer).

The listing server 216 is configured to determine an expected monetization for each document stored in association with the document index server 214 based, in part, upon the bid associated therewith. In this regard, the bids received in association with documents stored in the document index server 214, are stored, with their document identifier, in association with the listing server 216. Similar to the document index server, the volume of information received by the listing server 216 may be quite large. Accordingly, one or more listing server partitions 222a, 222b may be associated therewith.

To determine expected monetization of documents, the listing server 216 is configured to perform one or more validations with respect to the documents it receives from the document index server 214. By way of example only, the listing server 216 may be configured to apply probability-of-click models and exclusive and/or incremental targeting (e.g., time or keyword-based targeting) on the documents. Based upon the scores received from the document index server 214 and the validations performed, the listing server 216 is configured to perform a ranking of documents in terms of their relevance to the search query term and forward the ranking of documents, listed by document identifier, to the advertisement server 218.

The advertisement server 218 is configured to retrieve relevant advertisements based upon the ranking of documents received from the listing server 216. The content of the advertisements (but not any associated destination page(s)) is stored in association with the advertisement server 218, in conjunction with the associated document identifier. As the volume of advertisements may be quite large, one or more advertisement server partitions 224a, 224b may be associated therewith. The advertisement server 218 is further configured, once one or more relevant advertisements has been retrieved, to forward the advertisements to the keyword server 212, where information about the search query term and the retrieved advertisement(s) may be logged in an information log 226 associated therewith. The keyword server 212 may subsequently forward the advertisement(s) to the presentation component 208 of user device 202 (via network 210) for presentation to the user.

Referring now to FIG. 3, a flow diagram is illustrated that shows an exemplary method 300 for accepting documents and associated bids for presentation of advertisements in response to a search query term. Initially, a document is received (for instance, by document index server 214 of FIG. 2). This is indicated at block 302. As previously mentioned, a document may include only the content of an advertisement (or a portion thereof) or the content of an advertisement (or a portion thereof) in conjunction with the content of at least a portion of one or more destination pages. Prior to, simultaneously with, or subsequent to receipt of the document, at least one bid associated with the document is also received, e.g., by document index server 214 of FIG. 2. This is indicated at block 304. If the document includes the content of multiple destination pages in conjunction with the advertisement, multiple bids, differentially placed with respect to each destination page, may be received, if desired. Next, as indicated at block 306, it is determined whether or not any bid refinements are desired. Bid refinements may include, by way of example only and not limitation, exclusive and/or incremental targeting (e.g., time or keyword-based) refinements. If it is determined that one or more bid refinements are desired, such bid refinement(s) are received, as indicated at block 308, and associated with the bid, as indicated at block 310.

Once all desired bid refinements have been received, or if it is determined at block 306 that no bid refinements are desired, the document is assigned a unique document identifier, as indicated at block 312. It will be understood and appreciated by those of ordinary skill in the art that a document identifier may be assigned upon receipt of the document, if desired, rather than after any desired bid refinements have been specified. Additionally, if the document includes the content of multiple destination pages in conjunction with the advertisement and differential bids on the pages is desired, each advertisement/destination page combination may be assigned its own unique document identifier, if desired. Any and all such variations are contemplated to be within the scope hereof.

Subsequently, as indicated at block 314, the document and associated bid (and any refinements, if applicable), are stored in association with the document identifier. In one embodiment, the document is stored in association with the document index server 214 and the bid (and any applicable refinements) is stored in association with the listing server 216.

Turning now to FIG. 4, a flow diagram is illustrated that shows an exemplary method 400 for selecting advertisements for presentation in response to a search query term. Initially, as indicated at block 402, a search query term is received, e.g., from the request receiving and transmitting component 206 of the user device 202 of FIG. 2. Subsequent to, simultaneously with, or prior to receipt of the search query term, at least one document having an advertisement and a bid associated therewith is received, for instance, by document index server 214 of FIG. 2. This is indicated at block 404. It will be understood by those of ordinary skill in the art that, as a practical matter, a plurality of documents will generally be received and stored by the advertisement selection system 204 (FIG. 2) prior to receipt of any particular search query term.

Next, it is determined whether the document received is relevant to the search query term. This is indicated at block 406. Exemplary methods for determining relevance are discussed more fully below with reference to FIGS. 5A and 5B. If it is determined that the document is not relevant to the search query term, the advertisement associated with the document is not presented in response to the search query term. This is indicated at block 408. However, if it is determined that the document is relevant to the search query term, the advertisement associated with the document is presented in response to the search query term, as indicated at block 410. Typically, presentation of the advertisement comprises displaying the advertisement on a display device associated with the user device 202 of FIG. 2. However, other types of presentation, such as an audible presentation, may also be provided within the scope of embodiments of the present invention.

Figure 5A:
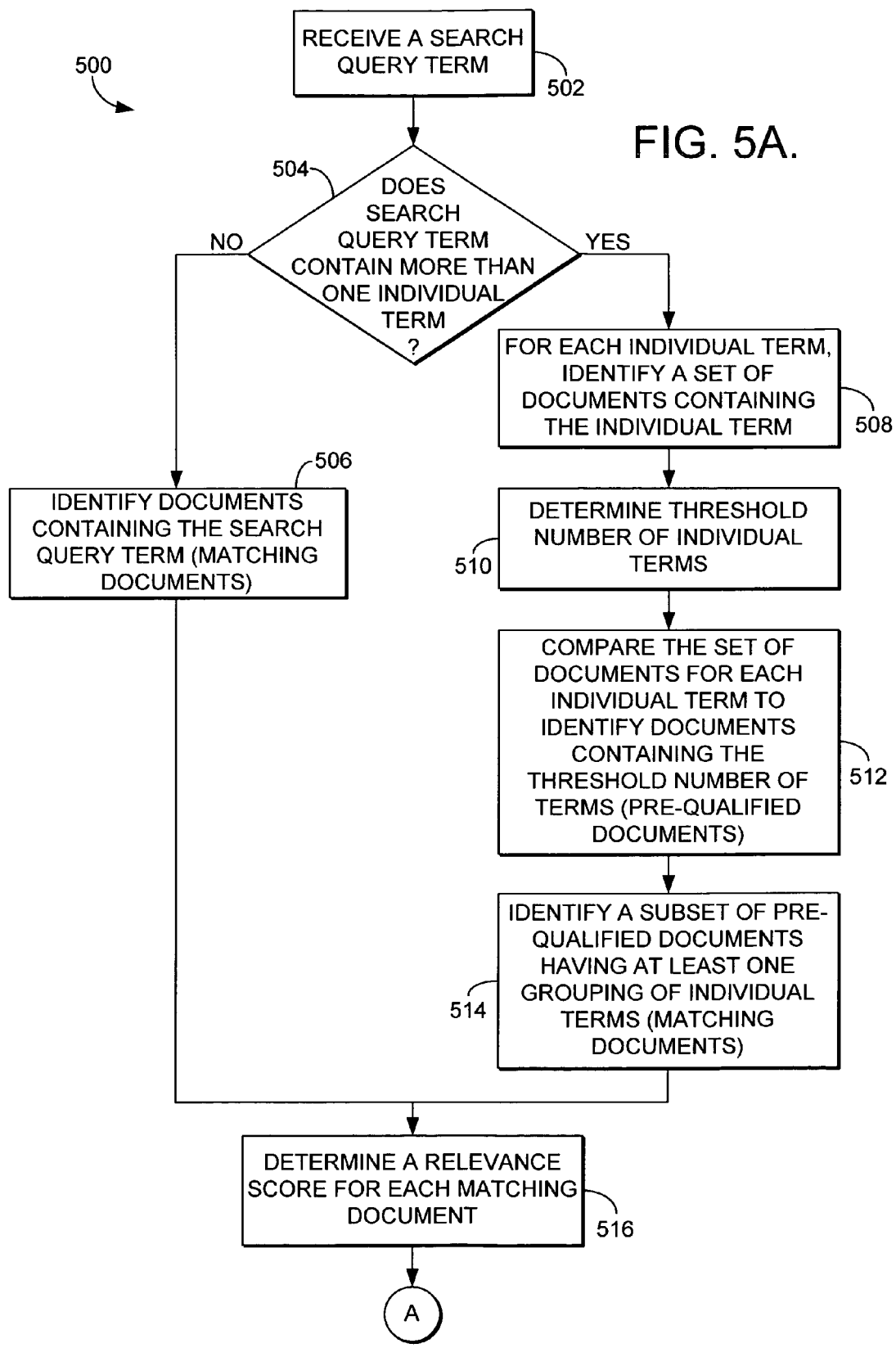
FIGS. 5A and 5B are a flow diagram, in accordance with an embodiment of the present invention, illustrating a method for selecting advertisements for presentation in response to a search query term, the method having more detail than the method illustrated in FIG. 4.
Figure 5B:
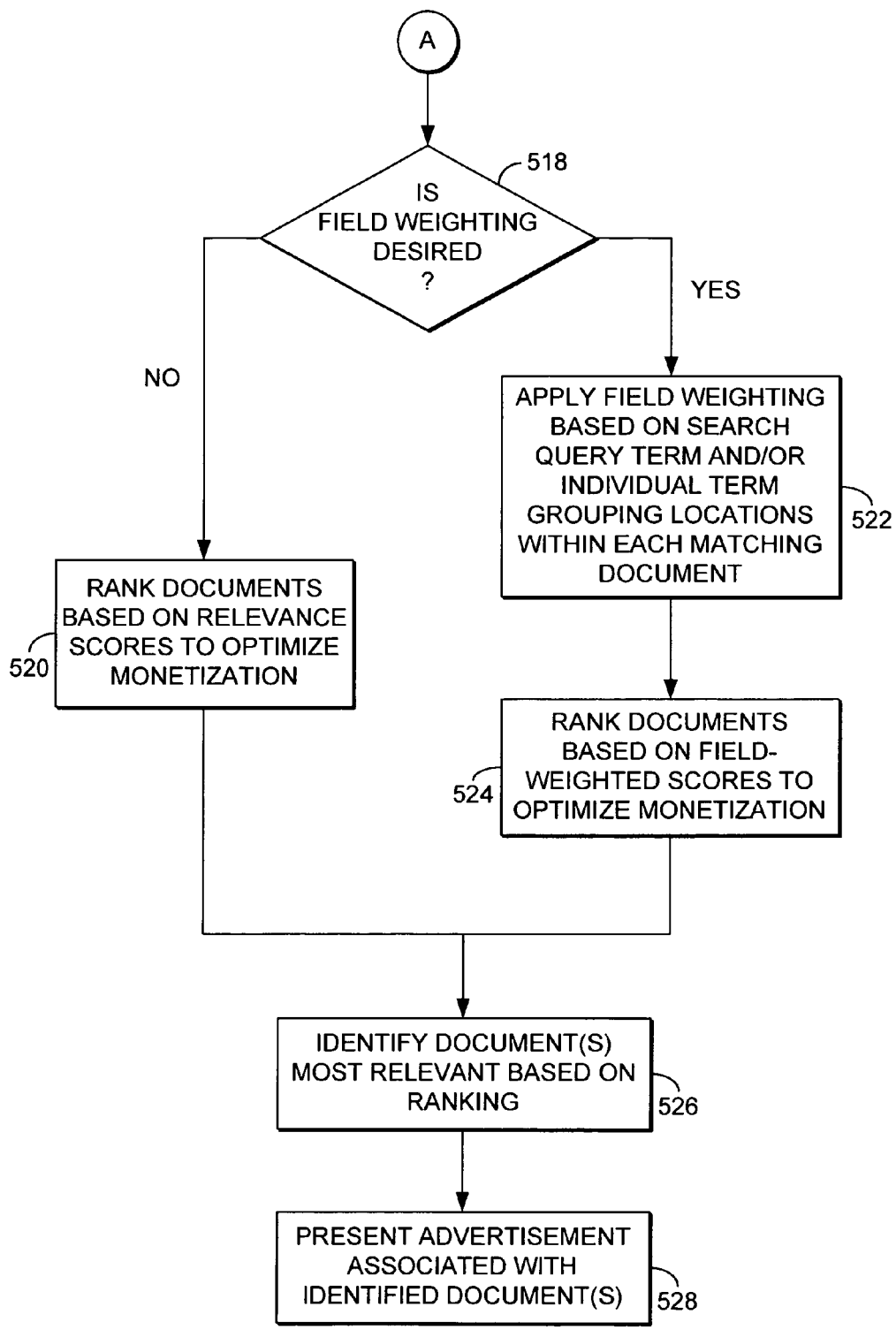

Turning now to FIGS. 5A and 5B, a flow diagram is illustrated that shows an exemplary method 500 for selecting advertisements for presentation in response to a search query term, the method 500 having more detail than the method 400 shown in the flow diagram of FIG. 4. Typically, a plurality of documents would have already been received and stored in association with the advertisement selection system 204 of FIG. 2 prior to initiation of the method of FIG. 5.

Initially, as indicated at block 502 of FIG. 5A, a search query term is received, for instance, by the advertisement selection system 204 of FIG. 2. Subsequently, as indicated at block 504, it is determined whether or not the search query term contains more than one individual term. In one embodiment, such determination is made by the document index server 214 of FIG. 2 (and/or the document index server partitions 220a, 220b, as appropriate). If it is determined that the search query term does not contain more than one individual term, a set of matching documents, that is, documents containing the search query term, is identified as a set of potentially relevant documents, as indicated at block 506. In one embodiment, such identification is performed by the document index server 214 of FIG. 2.

If it is determined at block 504 that the search query term does contain more than one individual term, noise words are identified and eliminated from the search query term and each remaining individual term is separately examined to determine potentially relevant documents. That is, for each remaining individual term, a set of documents containing the individual term is identified. This is indicated at block 508. In one embodiment, such document identification (and noise word elimination) is performed by the document index server 214 of FIG. 2 (and/or the document index server partitions 220a, 220b, as appropriate).

Next, as indicated at block 510, a threshold number of individual terms that each relevant document must contain is determined. Such threshold numbers are typically pre-determined and stored in association with the advertisement selection system 204. For instance, for a search query term containing five individual terms, a threshold number of individual terms that each relevant document must contain for the advertisement associated therewith to be considered for display may be three individual terms.

Subsequently, the sets of documents identified as potentially relevant for each individual term are compared with one another and documents containing the threshold number of individual terms are identified. This is indicated at block 512. Thus, those documents identified as potentially relevant for each individual term (at block 508) that are then determined to contain fewer than the threshold number of individual terms (e.g., three terms if the search query term is five individual terms) are removed from the list of potentially relevant documents. The set of documents remaining after such comparison may be referred to as pre-qualified documents. In one embodiment, such document comparison is performed by the document index server 214 of FIG. 2 (and/or the document index server partitions 220a, 220b, as appropriate).

Next, a subset of the pre-qualified documents that contain at least one grouping of individual terms is identified, as indicated at block 514, as the set of matching documents. Documents which contain one or more groupings of individual terms not only contain the individual terms but the different individual terms occur in the document with reasonably close proximity to one another. What an advertiser or the search engine determines qualifies as "reasonably close proximity" may vary and is typically pre-determined and stored in association with the advertisement selection system 204. For instance, individual terms may be viewed as reasonably close if they are within twenty words of one another or in the same paragraph as one another, whereas if one individual term occurs in the first paragraph of the document and a second individual term occurs in the fifth paragraph of the document, the individual terms may not be viewed as reasonably close to one another. In the latter situation, the occurrence of individual terms would not be considered a grouping.

Subsequently, for each document in the set of matching documents, a relevance score is determined, as indicated at block 516. In one embodiment, such scores may be determined utilizing the following algorithm:

$$\sum_{T \in Q} w^{(1)} \frac{(k_1 + 1)tf}{K + tf} \frac{(k_3 + 1)qtf}{k_3 + qtf}$$

In the above algorithm, Q is a search query containing term T.

$w^{(1)}$ is the Robertson/Sparck Jones weight of T in the document collection (i.e., the number of documents stored in the document index server 214 of FIG. 2) determined as:

$$\log \frac{(N - n + 0.5)}{(n + 0.5)},$$

where N is the number of documents in the collection (i.e., the number of documents stored in the document index server 214 of FIG. 2) and n is the number of matching documents. Note that if it was determined at block 504 of FIG. 5A that the search query term contained only a single individual term, n is the number of documents containing the search query term T. However, if it was determined at block 504 of FIG. 5A that the search query term contained multiple individual terms, n is the number of documents containing the threshold number of individual terms and at least one grouping of individual terms.

K is $k_{(1)}*((1-b)+b*dl/avdl)$.

$k_{(1)}$, b and $k_3$ are parameters which depend on the nature of the queries and the document collection (i.e., the documents stored in the document index server 214 of FIG. 2).

tf is the frequency of occurrence of the term T, or groupings of individual terms, whichever is appropriate, within the specified document D (that is, the document being scored).

qtf is the frequency of the term T within Q. Note that qtf will generally be equal to one.

dl and avdl are the document length of the specified document D (i.e., the document being scored) and average document length of all documents stored in the document index server 214 of FIG. 2 (either in words or in bytes), respectively.

Turning now to FIG. 5B, once a relevance score has been determined for each document in the set of matching documents, it is determined if field weighting is desired, as indicated at block 518. Field weighting would take into account, for instance, that an occurrence of the search query term (or of a grouping of individual terms) may be more relevant if it is in the first paragraph of the document rather than in the fifth paragraph of the document. If field weighting is desired, the relevance score determined at block 516 of FIG. 5A may be adjusted up or down depending on the location of the term or grouping within the document. Techniques for applying field weighting to scored documents are known to those of ordinary skill in the art and, accordingly, are not further discussed herein.

If field weighting is not desired, each document in the set of matching documents is ranked based upon its relevance score to optimize monetization. This is indicated at block 520. Such ranking is typically performed by the listing server 216 of FIG. 2 (or listing server partitions 222a, 222b, as appropriate) taking into account probability of click models, any bid refinements (e.g., exclusive and/or incremental targeting) desired, and the bid associated with the document. Probability of click models are known to those of ordinary skill in the art and, accordingly, are not further discussed herein.

If it is determined at block 518 of FIG. 5B that field weighting is desired, field weighting is applied to the relevance score based upon, e.g., the search query term and/or individual term grouping locations within each matching document, as indicated at block 522. Subsequently, each document in the set of matching documents is ranked based upon its field-weighted relevance score to optimize monetization. This is indicated at block 524. As mentioned above with reference to block 520, such ranking is typically performed by the listing server 216 of FIG. 2 (or listing server partitions 222a, 222b, as appropriate) taking into account probability of click models, any bid refinements (e.g., exclusive and/or incremental targeting) desired, and the bid associated with the document.

Subsequently, a ranking of the matching documents, in association with their respective document identifiers, is forwarded to the advertisement server 218 where the document or documents which are most relevant based upon the rankings are identified. This is indicated at block 526 of FIG. 5B. If only one advertisement is to be displayed in response to the search query term, only a single document is identified, that is, the document receiving the highest ranking. If, however, more than one advertisement is to be displayed in response to the search query term, more than one document may be identified. Next, the advertisement that is included as part of the identified document(s) is retrieved and forwarded to the keyword server 212 of FIG. 2 where information about the search query term and the advertisement(s) retrieved in response thereto is logged in an information log 226 associated therewith. Subsequently, the advertisement(s) is presented to the user, as indicated at block 528. Such presentation may be performed by the keyword server 212 forwarding the advertisement to the user device 202 (via network 210) and the advertisement being presented by the presentation component 208.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for selecting advertisements for presentation in response to a search query term, the method comprising:
    receiving the search query term input by a user from a user device;
    receiving at least one advertisement that includes a first destination webpage having a bid associated therewith;
    determining the at least one advertisement contains at least part of the search query term input by the user;
    determining the first destination webpage associated with the at least one advertisement contains at least part of the search query term input by the user;
    determining a plurality of destination webpages associated with a plurality of advertisements contain the at least part of the search query term;
    performing a comparison of a document length of the first destination webpage to an average document of the plurality of webpages;
    based on the comparison, selecting the first destination webpage for display over the plurality of destination webpages;
    identifying a subset of the plurality of advertisements containing the individual term;
    determining a threshold number of individual terms;
    identifying a set of pre-qualified advertisements by comparing the subset of the plurality of advertisements for each individual term with one another to
    identify advertisements containing the threshold number of individual; and
    based on the selecting the first destination webpage, presenting the at least one advertisement.

2. The method of claim 1, wherein receiving at least one advertisement comprises receiving a plurality of advertisements, each advertisement having a bid associated therewith.

3. The method of claim 2, further comprising identifying a subset of the plurality of advertisements, wherein determining the at least one advertisement contains at least part of the search query term comprises determining each advertisement of the subset of advertisements contains at least part of the search query term.

4. The method of claim 2, further comprising determining if the received search query term includes more than one individual term.

5. The method of claim 4, further comprising identifying a set of matching advertisements, wherein each of the matching advertisements is a member of the set of pre-qualified advertisements and includes at least one grouping of two or more of the individual terms in the search query term.

6. The method of claim 5, wherein determining the at least one advertisement contains at least part of the search query term comprises determining each advertisement of the set of matching advertisements contains at least part of the search query term.

7. The method of claim 6, further comprising:
    ranking each advertisement of the set of matching advertisements that is determined to contain at least part of the search query term; and
    selecting at least one advertisement of the set of matching advertisements that is determined to contain at least part of the search query term for presentation based upon the ranking received by the at least one advertisement.

8. The method of claim 1, wherein the at least one advertisement includes a second destination webpage having a bid associated therewith, wherein if the second destination webpage contains at least part of the search query term input by the user, an advertisement associated with the second destination webpage is presented in response to receiving the search query term.

9. The method of claim 1, wherein determining if the at least one advertisement contains at least part of the search query term input by the user comprises data mining the advertisement.

10. The method of claim 1, wherein the search query term input by the user is received from a request receiving and transmitting component of the user device.

11. A method for selecting advertisements for presentation in response to a search query term, the method comprising:
    receiving the search query input by a user from a user device;
    receiving at least one advertisement that includes a first destination webpage having a bid associated therewith;
    determining the at least one advertisement contains a portion of the search query input;
    determining a plurality of destination webpages associated with a plurality of advertisements contain the portion of the search query input;
    calculating relevance scores for the first destination webpage and each of the plurality of destination webpages, wherein each relevance score is based on:
    (1) a frequency the portion of the search query input occurs more than once in the search query input, and
    (2) a second frequency the portion of the search query input occurs in the first destination webpage or one of the plurality of destination webpages;
    identifying a subset of the plurality of advertisements containing the individual term;
    determining a threshold number of individual terms;
    identifying a set of pre-qualified advertisements by comparing the subset of the plurality of advertisements for each individual term with one another to
    identify advertisements containing the threshold number of individual; and
    based on the relevance scores, presenting the first destination webpage.

\* \* \* \* \*